United States Patent Office 2,882,244
Patented Apr. 14, 1959

2,882,244

MOLECULAR SIEVE ADSORBENTS

Robert M. Milton, Buffalo, N.Y., assignor to Union Carbide Corporation, a corporation of New York No Drawing. Application December 24, 1953
Serial No. 400,389

20 Claims. (Cl. 252—455)

This invention relates to an adsorbent of the molecular sieve type and, more particularly, to a synthetic crystalline form of sodium aluminum silicate, its derivatives, and methods of making and activating these adsorbents.

It is the principal object of the invention to provide an adsorbent of the molecular sieve type having improved adsorbing properties. A further object is to provide a novel crystalline metal aluminum silicate suitable for use as an adsorbent. Still another object of the invention is to provide a synthetic material having unique adsorptive properties and a high adsorptive capacity. Another object of the invention is to provide a convenient and efficient method of making and activating the novel adsorbent of the invention.

Naturally occurring hydrated metal aluminum silicates are called zeolites. The synthetic adsorbents of the invention have compositions similar to some of the natural zeolites. Accordingly, the term "zeolite" would appear to be appropriately applied to the adsorbents of the invention. There are, however, significant differences between the synthetic and natural materials. To distinguish the one from the other the material of the invention, synthetic crystalline sodium aluminum silicate and its derivatives, will be designated hereinafter by the term "zeolite X."

Certain adsorbents, including zeolite X, selectively adsorb molecules on the basis of the size and shape of the adsorbate molecule and are called molecular sieves. Molecular sieves have a sorption area available on the inside of a large number of uniformly sized pores of molecular dimensions. With such an arrangement molecules of a certain size and shape enter the pores and are adsorbed while larger or differently shaped molecules are excluded. Not all adsorbents behave in the manner of molecular sieves. The common adsorbents, charcoal and silica gel, for example, do not exhibit molecular sieve action.

Zeolite X consists basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example an alkali or alkaline earth metal ion. This balance may be expressed by the formula $$Al_2/(Ca, Sr, Ba, Na_2, K_2)=1$$

One cation may be exchanged for another by ion exchange techniques which are described below. The spaces between the tetrahedra are occupied by water molecules prior to dehydration.

Zeolite X may be activated by heating to effect the loss of the water of hydration. The dehydration results in crystals interlaced with channels of molecular dimensions that offer very high surface areas for the adsorption of foreign molecules. The interstitial channels are of a size such that at their narrowest points molecules with maximum dimensions of the minimum projected cross-sections greater than that of heptacosafluorotributylamine will not enter into the channels. Factors influencing occlusion by activated zeolite X crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite X are quite as important as the adsorptive or positive adsorption characteristics. For instance, if benzene and heptacosafluorotributylamine $(C_4F_9)_3N$ are to be separated, it is as essential that the crystals refuse the heptacosafluorotributylamine as it is that they adsorb the benzene.

A feature of the invention is the relatively simple process by which zeolite X may be prepared. Although there are a number of cations that may be present in zeolite X it is preferred to formulate or synthesize the sodium form of the crystal since the reactants are readily available and water soluble. The sodium in the sodium form of zeolite X may be easily exchanged for other cations as will be shown below. Essentially the preferred process comprises heating a proper mixture, in aqueous solution, of the oxides, or of materials whose chemical compositions can be completely represented as mixtures of the oxides, $Na_2O$, $Al_2O_3$, $SiO_2$, and $H_2O$, suitably at a temperature of about 100° C. for periods of time ranging up to 90 hours or longer. The product which crystallizes from the hot mixture is filtered off, washed with distilled water until the effluent wash water in equilibrium with the zeolite has a pH of from about 9 to 12. The material, after activation as by drying, is ready for use as a molecular sieve.

A crystallization temperature of about 100° C. has been found to be particularly advantageous in this process. The temperature is easy to maintain. It is high enough to effectively promote the reaction and yet low enough to yield crystals with a high water content which, upon activation, have a high adsorbing capacity.

Zeolite X may be distinguished from other zeolite and silicates on the basis of its X-ray powder diffraction pattern and certain physical characteristics. The X-ray patterns for several of the ion exchanged forms of zeolite X are described below. The composition and density are among the characteristics which have been found to be important in identifying zeolite X.

The basic formula for all crystalline zeolites where "M" represents a metal and "$n$" its valence may be represented as follows:

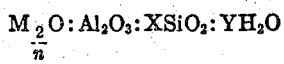

In general a particular crystalline zeolite will have values for X and Y that fall in a definite range. The value X for a particular zeolite will vary somewhat since the aluminum atoms and the silicon atoms occupy essentially equivalent positions in the lattice. Minor variations in the relative numbers of these atoms does not significantly alter the crystal structure or physical properties of the zeolite. For zeolite X, numerous analyses have shown that an average value for X is about 2.5. The X value falls within the range 2.5±0.5.

The value of Y is not necessarily an invariant for all samples of zeolite X particularly among the various ion exchanged forms of zeolite X. This is true because various exchangeable ions are of different size, and, since there is no major change in the crystal lattice dimensions upon ion exchange, more or less space should be available in the pores of the zeolite X to accommodate water molecules.

The average value for Y determined by heating fully hydrated sodium zeolite X to 500° C. at about 0.1 millimeter pressure was 6.2. A higher value of Y is that found for partially exchanged lithium zeolite X, and magnesium zeolite X, the fully hydrated forms of which show a Y value of about 7.2. A Y value up to about 8 may be obtained with fully exchanged magnesium or lithium zeolite X. Partially exchanged calcium and barium zeolite X have Y values of about 6.4 and 6.2, respectively, and the fully exchanged materials have Y values up to about 7.

In zeolite X synthesized according to the preferred procedure, the ratio $Na_2O/Al_2O_3$ should equal one. But if all of the excess alkali present in the mother liquor is not washed out of the precipitated product, analysis may show a ratio greater than one, and if the washing is carried too far, some sodium may be ion exchanged by hydrogen, and the ratio will drop below one. It has been found that due to the ease with which hydrogen exchange takes place, the ratio for zeolite X lies in the range of $$\frac{M_{\frac{2}{n}}O}{Al_2O_3} = 0.9 \pm 0.2$$

where "M" represents a metal and "$n$" its valence. A typical analysis for sodium zeolite X, expressed in terms of oxides, is $0.9Na_2O:Al_2O_3:2.5SiO_2:6.1H_2O$.

Thus the formula for zeolite X may be written as follows:

$$0.9 \pm 0.2 M_{\frac{2}{n}}O : Al_2O_3 : 2.5 \pm 0.5 SiO_2 : YH_2O$$

In this formula "M" represents a metal, "$n$" its valence, and "Y" may be any value up to 8 depending on the identity of the metal and the degree of hydration of the crystal.

The pores of zeolite X are normally filled with water and in this case, the above formula represents the chemical analysis of zeolite X. When other materials as well as water are in the pores, chemical analysis will show a lower value of Y and the presence of other adsorbates. The presence in the crystal lattice of materials volatile at temperatures below about 600° C. does not significantly alter the usefulness of zeolite X as an adsorbent since the pores are usually freed of such volatile materials during activation.

The apparent densities of fully hydrated samples of several forms of zeolite X were determined by the flotation of the crystals on liquids of appropriate densities. The technique and liquids used are discussed in an article entitled "Density of Liquid Mixture" appearing in Acta Crystal lographica, 1951, vol. 4, page 565. These densities, in grams per cubic centimeter, are as follows: sodium zeolite X—1.93; lithium zeolite X—1.89; rubidium zeolitet X—2.15; magnesium zeolite X—1.95; calcium zeolite X—1.96; barium zeolite X—2.31; and cerium zeolite X—2.15. The accuracy of these measurements is within ±0.1 of a gram per cc.

In making the sodium form of zeolite X, representative reactants are silica gel, silicic acid, colloidal silica or sodium silicate as a source of silica. Alumina may be obtained from activated alumina, gamma alumina, alumina trihydrate, or sodium aluminate. Sodium hydroxide may supply the sodium ion and in addition assist in controlling the pH. Preferably the reactants are water soluble. A solution of the reactants in the proper proportions is placed in a container, suitably of metal or glass. The container is closed to prevent loss of water and the reactants heated for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite. The initial mixing of ingredients is conveniently done at room temperature but this is not essential.

A crystallization temperature of about 100° C. has been found to be particularly advantageous in this process. The temperature is easy to maintain. It is high enough to effectively promote the reaction and yet low enough to yield crystals with a high water content which, upon activation, have a high adsorbing capacity. Satisfactory results have been obtained with the temperature of the reaction as low as about 21° C. and as high as about 120° C., the pressure being atmospheric or at least that corresponding to the vapor pressure of water in equilibrium with the mixture at the higher temperature. Any suitable heating apparatus, for instance an oven, sand bath, oil bath, or jacketed autoclave may be used. For convenience, in laboratory work, glass vessels containing the reactants are held immersed in a bath of boiling water giving a temperature of about 100° C. In quantity production, steam jacketed vessels offer a convenient means of controlling the temperature. For temperatures between room temperature (21° C.) and 120° C., increasing the reaction temperature increases the rate of reaction and decreases the reaction period. For example, sodium zeolite X is obtained in 88 hours at 50° C., in about 6 hours or less at 100° C., and in about 1½ hours at 120° C. Once the zeolite crystals have formed they maintain their structure, and holding the reaction temperature for a longer time than is necessary for the maximum yield of crystals does no harm at temperatures of 100° C. or lower. For instance, zeolite X which may be completely crystallized within six hours at 100° C. can remain in contact with the mother liquor at 100° C. for an additional 50 to 100 hours with no apparent change in yield or crystal structure.

After the reaction period, the zeolite crystals are filtered off. The reaction magma may be filtered at the reaction temperature if desired but hot magmas are preferably cooled to room temperature before filtering. The filtrate, or mother liquor, may be reused after enrichment with the proper amounts of reactants to give a properly proportioned reactant mixture. The mass of zeolite crystals is washed (preferably with distilled water and conveniently in the filter) until the effluent wash water, in equilibrium with the zeolite has a pH of between 9 and 12.

Thereafter, the crystals are dried, conveniently in a vented oven at a temperature of between about 25° C. and 150° C. For X-ray and chemical analysis, this drying is sufficient. In practical use, there need be no separate drying step since the zeolite will dry as it is activated. The individual crystals of zeolite X appear to be cubic. Most of the crystals have a size in the range 0.1 micron to 100 microns.

In the synthesis of zeolite X, it has been found that the composition of the reacting mixture is critical. The crystallizing temperature and the length of time the crystallizing temperature is maintained are important variables in determining the yield of crystalline material. Under some conditions, for example too low a temperature for too short a time, no crystalline materials are produced. Extreme conditions may also result in the production of materials other than zeolite X.

Specific examples of the production of the sodium form of zeolite X are given in Table I below. The mixtures and treatments described resulted in essentially pure crystalline zeolite X except in run 5 in which a trace of another crystalline form of sodium aluminum silicate was mixed with the zeolite X. In the table the term "Solution A" designates a water solution of sodium silicate containing about 20% by weight $Na_2O$ and 32% by weight $SiO_2$; the term "Solution B" designates a water solution of sodium silicate containing about 7.5% by weight $Na_2O$ and 25.8% by weight $SiO_2$; and the term "Solution C" designates a colloidal suspension of silica in water containing about 29.5% by weight $SiO_2$.

TABLE I

| Run No. | Reactants | Temp., °C. | Duration, hours | Ratio of oxides | | |
|---|---|---|---|---|---|---|
| | | | | $SiO_2/Al_2O_3$ | $Na_2O/SiO_2$ | $H_2O/Na_2O$ |
| 1 | 10 gm. $NaAlO_2$, 32 gm. "Solution A," 5.5 gm. NaOH, 135 cc. $H_2O$. | 100 | 47 | 3.0 | 1.3 | 38 |
| 2 | 10 gm. $NaAlO_2$, 32 gm. "Solution A," 5.5 gm. NaOH, 185 cc. $H_2O$. | 100 | 47 | 3.0 | 1.3 | 50 |
| 3 | 20 gm. $NaAlO_2$, 64 gm. "Solution A," 11 gm. NaOH, 310 cc. $H_2O$. | 60 | 65 | 3.0 | 1.3 | 41 |
| 4 | 50 gm. $NaAlO_2$, 160 gm. "Solution A," 27.5 gm. NaOH, 775 cc. $H_2O$. | 100 | 15 | 3.0 | 1.3 | 41 |
| 5 | 18.4 gm. $NaAlO_2$, 278 gm. "Solution B," 34.2 gm. NaOH, 88 cc. $H_2O$. | 100 | 6 | 11.4 | 0.72 | 18 |
| 6 | 15.9 gm. $Al_2O_3 \cdot 3H_2O$, 351 gm. "Solution B," 47.4 gm. NaOH, 52 cc. $H_2O$. | 100 | 24 | 14.5 | 0.65 | 17 |
| 7 | 5 gm. $NaAlO_2$, 114 gm. "Solution C," 29.7 gm. NaOH, 36 cc. $H_2O$. | 50 | 11[1] | 20 | 0.72 | 17 |
| 8 | 10 gm. $NaAlO_2$, 59 gm. "Solution A," 94 cc. $H_2O$. | 100 | 47 | 5.6 | 0.76 | 29 |
| 9 | 20 gm. $NaAlO_2$, 59 gm. "Solution A," 11 gm. NaOH, 270 gm. $H_2O$. | 120 | 1½ | 3.0 | 1.3 | 38 |

[1] Days.

The sodium form of zeolite X has been produced at 100° C., essentially free from contaminating materials, from reacting mixtures whose compositions, expressed as mixtures of oxides, fall within the following ranges:

$SiO_2/Al_2O_3$ --------------------------------- 3–5
$Na_2O/SiO_2$ --------------------------------- 1.2–1.5
$H_2O/Na_2O$ --------------------------------- 35–60

Zeolite X has also been produced, in admixture with other crystalline sodium aluminum silicates and crystalline alumina, from reactants in proportions outside the above ranges. For instance, zeolite X has been produced in admixture with one crystalline form of sodium aluminum silicate by holding at 100° C. reacting mixtures whose compositions, expressed as mixtures of oxides, fall within the following ranges:

$SiO_2/Al_2O_3$ --------------------------------- 2–40
$Na_2O/SiO_2$ --------------------------------- 0.6–6.0
$H_2O/Na_2O$ --------------------------------- 10–30

Similarly zeolite X, mixed with still another crystalline form of sodium aluminum silicate, has been produced by holding at 100° C. reaction mixtures whose compositions, expressed as oxide ratios, fall within the following ranges:

$SiO_2/Al_2O_3$ --------------------------------- 2.4–30
$Na_2O/SiO_2$ --------------------------------- 0.4–6.5
$H_2O/Na_2O$ --------------------------------- 10–90

Similarly, zeolite X mixed with another crystalline form of sodium aluminum silicate has been produced at 100° C. from reaction mixtures whose compositions, expressed as oxide ratios, fall within the following ranges:

$SiO_2/Al_2O_3$ --------------------------------- 3–15
$Na_2O/SiO_2$ --------------------------------- 4–7
$H_2O/Na_2O$ --------------------------------- 30–70

Zeolite X has also been produced, mixed with yet another crystalline form of sodium aluminum silicate, by holding at 100° C. a reaction mixture of the following initial composition:

$SiO_2/Al_2O_3$ --------------------------------- 3.4
$Na_2O/SiO_2$ --------------------------------- 1.8
$H_2O/Na_2O$ --------------------------------- 28

When zeolite X has been prepared, mixed with other materials, the X-ray pattern of the mixture can be reproduced by a simple proportional addition of the X-ray patterns of the individual pure components.

Other properties, for instance molecular sieve selectivity characteristic of zeolite X are present in the properties of the mixture to the extent that zeolite X is part of the mixture.

The adsorbents contemplated herein include not only the sodium form of zeolite X as synthesized from a sodium-aluminum-silicate water system with sodium as the exchangeable cation, but also crystalline materials obtained from such a zeolite by partial or complete replacement of the sodium ion with other cations. The sodium cations can be replaced, in part or entirely by ion exchange with other monovalent, divalent, or trivalent cations. Monovalent ions, both smaller than sodium, such as lithium, and larger, such as potassium and ammonium, freely enter the zeolite X structure and exchange with other cations that might be present. The same is true for divalent ions smaller than sodium, such as magnesium, and larger, such as strontium and barium. Cerium is an example of a trivalent ion that enters the zeolite X structure.

The spatial arrangement of the aluminum, silicon, and oxygen atoms which make up the basic crystal lattice of the zeolite remains essentially unchanged by partial or complete substitution of other cations for the sodium ion. The X-ray patterns of the ion exchanged forms of zeolite X show the same principal lines at essentially the same positions, but there are some differences in the relative intensities of the X-ray lines due to the ion exchange.

Among the forms of zeolite X that have been obtained by direct synthesis and ion exchange are sodium, lithium, potassium, hydrogen, silver, ammonium, magnesium, calcium, zinc, barium, cerium, and manganese. For convenience these materials will be referred to by the appropriate chemical symbol for the cation and the letter X. Thus, for example, the sodium form becomes $Na_2X$, the calcium form becomes CaX, and the cerium form becomes $Ce_2X_3$.

Ion change of the sodium form of zeolite X ($Na_2X$) or other forms of zeolite X may be accomplished by conventional ion exchange methods. A preferred continuous method is to pack zeolite X into a series of vertical columns each with suitable supports at the bottom; successively pass through the beds a water solution of a soluble salt of the cation to be introduced into the zeolite; and change the flow from the first bed to the second bed as the zeolite in the first bed becomes ion exchanged to the desired extent.

To obtain hydrogen exchange, water or a water solution of an acid, such as hydrochloric acid, is effective as the exchanging solution. For sodium exchange, a water solution of sodium chloride is a suitable exchange medium. Other satisfactory reagents are: for potassium exchange, a water solution of potassium chloride or dilute potassium hydroxide; for lithium, magnesium, calcium, ammonium, nickel, or strontium exchange, water solutions of the chlorides of these elements; for zinc, silver or cerium exchange, a water solution of the nitrate of these elements; and for manganese, a manganous solution. While it is more convenient to use water soluble compounds of the exchange cations, other solutions containing the desired cations or hydrated cations may be used.

In a typical case of batch-wise exchange, 8 grams of sodium zeolite X ($Na_2X$) and 380 cc. of 0.05 molar aqueous solution of barium chloride was mixed in a beaker. The mixture was stirred for 2½ minutes, and the crystals were removed by filtering. The X-ray pattern of the crystals was that characteristic of zeolite X, and analysis showed that 55% of the sodium ions had been replaced by barium ions in the ratio of one barium ion to two sodium ions.

When this exchange was repeated, except that stirring was continued for 4½ minutes before filtering, the extent to which sodium ions had been replaced with barium ions was increased to 64%.

In another instance, fifteen grams of sodium zeolite X and 500 cc. of distilled water containing 34.7 grams of barium chloride were mixed and heated at 100° C. for one hour then filtered. The crystals thus obtained were treated again in the same manner and the resulting product was a barium zeolite X in which 93% of the sodium ions originally present had been replaced with barium ions.

In a column exchange, 37 grams of pelletized sodium zeolite X were packed loosely into a glass column to a height of 70 centimeters. Over a period of a little over five hours, two and three quarters liters of a 0.05 molar aqueous solution of zinc nitrate were passed through the column. Chemical analysis of the zeolite so exchanged indicated a 47% replacement of sodium ions with zinc ions in the ratio of one zinc for two sodium ions. By varying the concentration of the zinc or other exchange ion in the solution, or by varying the time allowed for ion exchange, or by varying the temperature, the exchange ion may replace up to nearly 100% of the sodium ions.

Among the ways of identifying zeolite X and distinguishing it from other zeolites and other crystalline substances, the X-ray powder diffraction pattern has been found to be a useful tool. In obtaining the X-ray diffraction powder patterns, standard techniques were employed. The radiation was the Kα doublet of copper, and a Geiger counter spectrometer with a strip chart pen recorder was used. The peak heights, I, and the positions as a function of 2θ where θ is the Bragg angle, were read from the spectrometer chart. From these, the relative intensities, $$\frac{100\ I}{I_0}$$

where $I_0$ is the intensity of the strongest line or peak, and $d$(obs) the interplanar spacing in A. corresponding to the recorded lines were calculated.

X-ray powder diffraction data for sodium zeolite X ($Na_2X$), and 89% exchanged calcium zeolite X (CaX), an 85% exchanged silver zeolite X ($Ag_2X$), a 77% exchanged cerium zeolite X ($Ce_2X_3$), a 59% exchanged lithium zeolite X ($Li_2X$), an 81% exchanged ammonium zeolite X, $(NH_4)_2X$, and a 93% exchanged barium zeolite X (BaX) are given in Table A. The table lists the $$\frac{100\ I}{I_0}$$

and the $d$(obs) values in angstroms (A.) for the observed lines for the different ion exchanged forms of zeolite X. The X-ray patterns indicate a cubic unit cell of dimensions between 24.5A. and 25.5A. In a separate column are listed the sum of the squares of the Miller indices ($h^2+k^2+l^2$) for a cubic unit cell that corresponds to the observed lines in the X-ray diffraction patterns. The $a_0$ values for each particular zeolite are also tabulated.

The relative intensities and the positions of the lines are only slightly different for the various ion exchanged forms of zeolite X. The patterns show substantially all of the same lines, and all meet the requirements of a cubic unit cell of approximately the same size. The spatial arrangement of silicon- oxygen- and aluminum atoms, i.e. the arrangement of the $AlO_4$ and $SiO_4$ tetrahedra, are essentially identical in all the forms of zeolite X. The appearance of a few minor lines and the disappearance of others from one form of zeolite X to another as well as slight changes in the intensities of some of the X-ray lines can be attributed to the different sizes and numbers of cations present in the various forms since these differences effect some small expansion or contraction of the crystals.

TABLE A

| $h^2+k^2+l^2$ | CaX | | $Ag_2X$ | | BaX | | $Ce_2X_3$ | |
|---|---|---|---|---|---|---|---|---|
| | 100 I/I₀ | d(obs in A.) | 100 I/I₀ | d(obs in A.) | 100 I/I₀ | d(obs in A.) | 100 I/I₀ | d(obs in A.) |
| 3 | 100 | 14.37 | 100 | 14.37 | 100 | 14.43 | 100 | 14.42 |
| 8 | 9 | 8.79 | 2 | 8.82 | 7 | 8.84 | 2 | 8.81 |
| 11 | 4 | 7.51 | 6 | 7.54 | | | | |
| 12 | | | | | 81 | 7.21 | | |
| 16 | | | 16 | 6.23 | 29 | 6.25 | 4 | 6.24 |
| 19 | 16 | 5.71 | | | 13 | 5.73 | 18 | 5.72 |
| 27 | 5 | 4.79 | 2 | 4.80 | 27 | 4.80 | 7 | 4.80 |
| 32 | 11 | 4.40 | 6 | 4.41 | 6 | 4.42 | 4 | 4.41 |
| 35 | | | 3 | 4.22 | | | | |
| 36 | | | | | | | 3 | 4.16 |
| 40 | 2 | 3.936 | | | 10 | 3.948 | | |
| 43 | 20 | 3.800 | 9 | 3.805 | 45 | 3.810 | 38 | 3.808 |
| 44 | 2 | 3.754 | 11 | 3.769 | 89 | 3.767 | 4 | 3.767 |
| 48 | 2 | 3.593 | 5 | 3.603 | 7 | 3.606 | | |
| 51 | 2 | 3.486 | 3 | 3.494 | 9 | 3.499 | 4 | 3.499 |
| 56 | 12 | 3.328 | 11 | 3.335 | 28 | 3.339 | 18 | 3.339 |
| 59 | 3 | 3.241 | 6 | 3.250 | 11 | 3.253 | 3 | 3.253 |
| 67 | 4 | 3.041 | | | 10 | 3.051 | | |
| 68 | | | 2 | 3.027 | | | | |
| 72 | 8 | 2.934 | 7 | 2.941 | 14 | 2.944 | 10 | 2.944 |
| 75 | 6 | 2.875 | 12 | 2.882 | 19 | 2.887 | 13 | 2.886 |
| 76 | | | | | 17 | 2.869 | | |
| 80 | 7 | 2.783 | 25 | 2.792 | 68 | 2.795 | 13 | 2.794 |
| 83 | 4 | 2.732 | 4 | 2.739 | 13 | 2.742 | 4 | 2.744 |
| 88 | 6 | 2.653 | 5 | 2.662 | 10 | 2.663 | 8 | 2.663 |
| 91 | 4 | 2.610 | 9 | 2.617 | 7 | 2.620 | 7 | 2.620 |
| 96 | | | 12 | 2.549 | 24 | 2.551 | 4 | 2.552 |
| 99 | | | | | 5 | 2.512 | | |
| 104 | 1 | 2.440 | | | | | 3 | 2.451 |
| 107 | | | | | 20 | 2.418 | | |
| 108 | 5 | 2.396 | | | 26 | 2.406 | | |
| 115 | | | | | 7 | 2.331 | | |
| 116 | | | | | 4 | 2.323 | | |
| 128 | 3 | 2.202 | 9 | 2.207 | 27 | 2.210 | 10 | 2.210 |
| 131 | 2 | 2.175 | 6 | 2.182 | | | 5 | 2.184 |
| 136 | 3 | 2.139 | 4 | 2.140 | 12 | 2.140 | 7 | 2.140 |
| 139 | 2 | 2.112 | 2 | 2.119 | | | 5 | 2.121 |
| 140 | | | | | 25 | 2.113 | | |
| 144 | 1 | 2.074 | | | | | | |
| 155 | 1 | 2.000 | | | | | | |
| 160 | | | 2 | 1.975 | | | | |
| 163 | | | 3 | 1.954 | | | 3 | 1.956 |
| 164 | 1 | 1.945 | | | | | | |
| 168 | 1 | 1.921 | | | | | | |
| 172 | | | | | 6 | 1.908 | | |
| 176 | | | 4 | 1.882 | 6 | 1.885 | | |
| 179 | 1 | 1.859 | | | | | | |
| 187 | 1 | 1.821 | | | 7 | 1.829 | | |
| 195 | 1 | 1.784 | | | | | 3 | 1.790 |
| 200 | 2 | 1.761 | | | 7 | 1.768 | 4 | 1.769 |
| 204 | | | | | 6 | 1.751 | | |
| 211 | 2 | 1.714 | | | | | | |
| 236 | | | | | 8 | 1.628 | | |
| 243 | 3 | 1.597 | 3 | 1.601 | 10 | 1.604 | 3 | 1.604 |
| | $a_0$=24.90 A. | | $a_0$=24.96 A. | | $a_0$=24.99 A. | | $a_0$=24.99 A. | |

| $h^2+k^2+l^2$ | $(NH_4)_2X$ | | $Li_1X$ | | $Na_2X$ | |
|---|---|---|---|---|---|---|
| | 100 I/I₀ | d(obs in A.) | 100 I/I₀ | d(obs in A.) | 100 I/I₀ | d(obs in A.) |
| 3 | 100 | 14.41 | 100 | 14.37 | 100 | 14.47 |
| 8 | 16 | 8.85 | 18 | 8.79 | 18 | 8.85 |
| 11 | 10 | 7.53 | 14 | 7.49 | 12 | 7.54 |
| 19 | 15 | 5.73 | 20 | 5.70 | 18 | 5.73 |
| 27 | 6 | 4.81 | 7 | 4.79 | 5 | 4.81 |
| 32 | 14 | 4.42 | 11 | 4.40 | 9 | 4.42 |
| 35 | 1 | 4.23 | 1 | 4.21 | 1 | 4.23 |
| 40 | 5 | 3.953 | 5 | 3.931 | 4 | 3.940 |
| 43 | 19 | 3.813 | 23 | 3.794 | 21 | 3.808 |
| 44 | 2 | 3.773 | 3 | 3.749 | 3 | 3.765 |
| 48 | 2 | 3.610 | 1 | 3.590 | 1 | 3.609 |
| 51 | 2 | 3.500 | 2 | 3.482 | 1 | 3.500 |
| 56 | 17 | 3.341 | 22 | 3.324 | 18 | 3.338 |
| 59 | 2 | 3.257 | 2 | 3.239 | 1 | 3.253 |
| 67 | 4 | 3.056 | 6 | 3.040 | 4 | 3.051 |
| 72 | 10 | 2.948 | 10 | 2.933 | 9 | 2.944 |
| 75 | 13 | 2.889 | 22 | 2.874 | 19 | 2.885 |
| 80 | 11 | 2.797 | 9 | 2.782 | 8 | 2.794 |
| 83 | 3 | 2.746 | 3 | 2.730 | 2 | 2.743 |
| 88 | 9 | 2.667 | 9 | 2.653 | 8 | 2.663 |
| 91 | 1 | 2.623 | 3 | 2.609 | 3 | 2.620 |
| 96 | 1 | 2.553 | 1 | 2.542 | 1 | 2.550 |

TABLE A (Cont'd)

| $h^2+k^2+l^2$ | (NH₄)₂X 100 I/I₀ | (NH₄)₂X d (obs in A.) | Li₂X 100 I/I₀ | Li₂X d (obs in A.) | Na₂X 100 I/I₀ | Na₂X d (obs in A.) |
|---|---|---|---|---|---|---|
| 104 | 1 | 2.451 | | | | |
| 108 | 4 | 2.407 | 6 | 2.395 | 5 | 2.404 |
| 123 | 1 | 2.256 | 1 | 2.244 | 1 | 2.254 |
| 128 | 4 | 2.210 | 3 | 2.200 | 3 | 2.209 |
| 131 | 2 | 2.183 | 2 | 2.175 | 3 | 2.182 |
| 136 | 2 | 2.140 | 3 | 2.139 | 2 | 2.141 |
| 139 | 1 | 2.121 | 2 | 2.110 | 2 | 2.120 |
| 144 | 2 | 2.084 | 2 | 2.074 | 1 | 2.083 |
| 147 | 1 | 2.060 | | | | |
| 155 | 1 | 2.007 | | | | |
| 164 | 1 | 1.952 | 2 | 1.945 | 1 | 1.952 |
| 168 | 1 | 1.929 | 2 | 1.920 | 1 | 1.928 |
| 179 | | | 2 | 1.860 | | |
| 184 | | | | | 1 | 1.842 |
| 187 | 1 | 1.829 | 2 | 1.820 | | |
| 195 | 1 | 1.790 | | | 1 | 1.789 |
| 200 | 2 | 1.767 | 2 | 1.760 | 2 | 1.767 |
| 211 | 3 | 1.721 | 5 | 1.713 | 3 | 1.721 |
| 236 | 1 | 1.628 | 1 | 1.621 | | |
| 243 | 3 | 1.604 | 5 | 1.596 | 3 | 1.603 |
| | $a_0=25.01$ A. | | $a_0=24.88$ A. | | $a_0=24.99$ A. | |

The more significant $d$ values for zeolite X are given in Table B.

TABLE B $d$ Value of reflection in A.

14.42±0.2
8.82±0.1
4.41±0.05
3.80±0.05
3.33±0.05
2.88±0.05
2.79±0.05
2.66±0.05

Occasionally, additional lines not belonging to the pattern for zeolite X, appear in a pattern along with the X-ray lines characteristic of zeolite X. This is an indication that one or more additional crystalline materials are mixed with zeolite X in the sample being tested. Frequently these additional materials can be identified as initial reactants in the synthesis of the zeolite, or as other crystalline substances. When zeolite X is heat treated at temperatures of between 100 and 600° C. in the presence of water vapor or other gases or vapors, the relative intensities of the lines in the X-ray pattern may be appreciably changed from those existing in the unactivated zeolite X patterns. Small changes in line positions may also occur under these conditions. These changes in no way hinder the identification of these X-ray patterns as belonging to zeolite X.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for zeolite X, are not to exclude those materials, which, due to some variable mentioned or otherwise known to those skilled in the art, fail to show all of the lines, or show a few extra ones that are permissible in the cubic system of zeolite X, or show a slight shift in position of the lines, so as to give a slightly larger or smaller lattice parameter.

A simple test described in "American Minerologist," vol. 28, page 545, 1943, permits a quick check of the silicon to aluminum ratio of the zeolite X. According to the description of the test, zeolite minerals with a three dimensional network that contains aluminum and silicon atoms in an atomic ratio of Al/Si=⅔=0.67, or greater, produce a gel when treated with hydrochloric acid. Zeolites having smaller aluminum to silicon ratios disintegrate in the presence of hydrochloric acid and precipitate silica. When about 0.2 gram of sodium zeolite X powder was mixed with water and about 2 milliliters of concentrated hydrochloric acid and then heated, a solid, nearly clear, gel was formed.

The zeolites contemplated herein exhibit adsorbtive properties that are unique among known adsorbents. The common adsorbents, like charcoal and silica gel, show adsorption selectivities based primarily on the boiling point or critical temperature of the adsorbate. Activated zeolite X on the other hand, exhibits a selectivity based on the size and shape of the adsorbate molecule. Among those adsorbate molecules whose size and shape are such as to permit adsorption by zeolite X, a very strong preference is exhibited toward those that are polar, polarizable, and unsaturated. Another property of zeolite X that contributes to its unique position among adsorbents is that of adsorbing large quantities of adsorbate at either very low pressures, at very low partial pressures, or at very low concentrations. One or a combination of one or more of these adsorption characteristics or others can make zeolite X useful for numerous gas or liquid separation processes where adsorbents are not now employed. The use of zeolite X permits more efficient and more economical operation of numerous processes now employing other adsorbents.

Common adsorbents like silica gel and charcoal do not exhibit any appreciable molecular sieve action, whereas the various forms of zeolite X do. This sieving action of sodium zeolite X is shown by the following table in which $P_0$ represents the vapor pressure of the adsorbate at 25° C. In this table as well as others in the specification the term "Weight % adsorbed" refers to the percentage increase in the weight of the adsorbent. The adsorbents were activated by heating them at a reduced pressure to remove adsorbed materials. Throughout the specification the activation temperature for zeolite X was 350° C., and the pressure at which it was heated was less than about 0.1 millimeter of mercury absolute unless otherwise specified. Likewise, the pressure given for each adsorption is the pressure of the adsorbate under the adsorption conditions unless the contrary is specified.

| Adsorbate | Temp. (° C.) | Pressure (mm. Hg) | Weight percent adsorbed on Na₂X |
|---|---|---|---|
| Octane | 25 | 11 | 30.0 |
| Benzene | 25 | 45 | 25.0 |
| m-Dichlorobenzene | 25 | $P_0$ | 35.5 |
| Heptacosafluorotributylamine | 23 | $P_0$ | 2.2 |

These data show that the porous structure of sodium zeolite X will permit free access to octane, benzene and dichloro benzene molecules, so that they are readily adsorbed. But zeolite X is shown not to permit entry of the heptacosafluorotributylamine. This adsorptive behavior permits the separation of mixtures of heptacosafluorotributylamine and larger molecules with benzene, toluene, octane or other molecular species small enough to be adsorbed.

Measurements with several ion exchanged forms of zeolite X show that pore size may differ from one form to another. Lithium zeolite X, sodium zeolite X and calcium zeolite X were tested with diphenyl methane, and although all three adsorbed the diphenyl methane, the rates of adsorption and the equilibrium adsorption capacities were different, as shown below:

| Adsorbent | Temperature (° C.) | Pressure | Weight percent diphenyl methane adsorbed in 9 hr. |
|---|---|---|---|
| $Na_2X$ | 25 | [1] $P_0$ | 5.9 |
| $Li_2X$ | 25 | $P_0$ | 11.1 |
| $CaX$ | 25 | $P_0$ | 15.7 |

[1] $P_0$ is the vapor pressure of diphenyl methane at 25° C.

The data indicate that the replacement of sodium ions in the original sodium zeolite X with one-half as many calcium ions of approximately the same size has opened the porous structure sufficiently to permit freer access by diphenyl methane. A somewhat less pronounced enlarging of the pore size is obtained by replacement of equal numbers of sodium ions with small lithium ions.

The adsorptive properties of zeolite X can be altered by partially filling the pores of zeolite X with a molecular species different from the one whose adsorption is being studied. This effect is shown by the adsorption of acetylene on $Na_2X$ that is completely activated and on $Na_2X$ samples that have been partially loaded with water.

| Condition of $Na_2X$ | Weight percent $C_2H_2$ adsorbed on $Na_2X$ at 700 mm. Hg and 25° C. |
|---|---|
| Completely activated | 15 |
| 5% by-weight water loaded | 12.4 |
| 15% by-weight water loaded | 7.2 |

Another unique property of zeolite X is its strong preference for polar, polarizable and unsaturated molecules, providing of course, that these molecules are of a size and shape which permits them to enter the pore system. This is in contrast to charcoal and silica gel which show a main preference based on the volatility of the adsorbate. The following table compares the adsorptions of water, a polar molecule, carbon dioxide, a polarizable molecule, and acetylene, an unsaturated molecule, on charcoal, silica gel and sodium zeolite X.

| Adsorbate | Temperature (° C.) | Pressure (mm. Hg) | Weight percent adsorbed | | |
|---|---|---|---|---|---|
| | | | $Na_2X$ | Silica gel | Charcoal |
| Water | 25 | 0.2 | 25.7 | 1.6 | 0.1 |
| Acetylene | 25 | 50 | 10.6 | 2.1 | 2.5 |
| Carbon dioxide | 25 | 50 | 15.7 | 1.3 | 2.2 |

The greater the degree of polarity, polarizability and unsaturation, the greater the affinity of zeolite X for the adsorbate. This is illustrated in the following data with a series of $C_2$ and $C_3$ hydrocarbons on sodium zeolite X.

| Pressure (mm. Hg) | Temperature (° C.) | Weight percent adsorbed on $Na_2X$ | | |
|---|---|---|---|---|
| | | $C_2H_6$ | $C_2H_4$ | $C_2H_2$ |
| 5 | 25 | 0.2 | 1.4 | 6.6 |
| 25 | 25 | 0.8 | 6.1 | 9.8 |

| Pressure (mm. Hg) | Temperature (° C.) | Weight percent adsorbed on $Na_2X$ | |
|---|---|---|---|
| | | $C_3H_8$ | $C_3H_6$ |
| 1 | 25 | 0.8 | 6.0 |
| 5 | 25 | 3.1 | 10.6 |

The adsorptive selectivity of zeolite X for polar over non-polar molecules is shown in the following table that compares carbon monoxide, a polar molecule, with argon, a non-polar molecule of approximately the same size and volatility.

| Adsorbate | Temperature (° C.) | Pressure (mm. Hg) | Weight percent adsorbed on BaX |
|---|---|---|---|
| Argon | −75 | 500 | 5.0 |
| Carbon monoxide | −75 | 500 | 10.0 |

The selectivity of zeolite X for an unsaturated aromatic hydrocarbon, toluene, compared to a saturated cyclic hydrocarbon, cyclohexane, is illustrated in the following data:

| Pressure (mm. Hg) | Temperature (° C.) | Weight percent adsorbed on $Na_2X$ | |
|---|---|---|---|
| | | Toluene | Cyclohexane |
| 0.05 | 25 | 13.0 | 7 |
| 0.10 | 25 | 19.7 | 12.3 |

Organic sulfur compounds are generally more polar or polarizable than their hydrocarbon counterparts and as a result the organic sulfur compounds can be selectively adsorbed from mixtures with hydrocarbons of approximately the same composition and degree of unsaturation. For instance thiophene and benzene have approximately the same volatility and are difficult to separate by distillation yet zeolite X can accomplish a separation by selective adsorption of thiophene. In one demonstration 6.6 grams of $Na_2X$ powder was put into 12 grams of a 24.3% thiophene-75.7% benzene mixture. After being shaken for a short time, the thiophene concentration in the supernatant liquid was reduced to 21.4%. In another test a vapor containing 0.44% thiophene in benzene was passed over a bed of $Na_2X$ and the first exit vapor contained only 0.19% thiophene.

The selectivity for a given adsorbate molecule is altered by ion exchange of the sodium zeolite X. Thus, for a particular adsorbate one of the many cation forms of zeolite X, such as barium zeolite X, may be a better adsorbent than the other cation forms of zeolite X. Furthermore, the relative selectivity between the various cation forms of zeolite X changes with the temperature or with the pressure at which adsorptions are made. Several illustrations of these effects are tabulated below:

| Adsorbate | Temperature (° C.) | Pressure (mm. Hg) | Weight percent adsorbed | | | | | | |
|---|---|---|---|---|---|---|---|---|---|
| | | | $Na_2X$ | CaX | MgX | BaX | MnX | $Li_2X$ | $Ce_2X_3$ |
| Water | 25 | 0.04 | | 22.9 | | 20.7 | 19.3 | | 13.1 |
| | 25 | 4.5 | 29.3 | 33.3 | 34.2 | 25.8 | 31.9 | 31.8 | 27.1 |
| Carbon monoxide | −75 | 25 | | 5.4 | | 8.1 | 4.5 | | 1.8 |
| | 0 | 25 | | 2.5 | | 0.8 | 0.8 | | 0.0 |
| | 0 | 750 | | 5.1 | | 6.8 | 4.2 | | 1.9 |
| Nitrogen | −75 | 738 | | 9.0 | | 10.8 | 8.6 | | 5.3 |
| n-Hexane | 25 | 20 | 19.2 | | 18.3 | 15.8 | 17.9 | 19.2 | 16.1 |
| Methyl cyclohexane | 25 | 38 | 20.7 | | 21.4 | 16.8 | 20.0 | 21.3 | 17.6 |

The high degree of selectivity shown by zeolite X for polar, polarizable and unsaturated molecules renders the zeolite X most useful in the separation of polar from less polar or non-polar molecules, polarizable from less or non-polarizable molecules, and unsaturated from less unsaturated or saturated molecules.

Zeolite X shows a selectivity for adsorbates, providing that they can enter the porous network of the zeolites, based on the boiling points of the adsorbates, as well as, on their polarity, polarizability or degree of unsaturation. For instance, hydrogen is not strongly adsorbed at room temperature because its boiling point is too low. A non-polar saturated ethane molecule is somewhat more strongly adsorbed at room temperature than the polar carbon monoxide molecule because the effect of the much lower boiling point of carbon monoxide ($-192°$ C.) as compared to that of ethane ($-88°$ C.) more than counterbalances the effect of the greater polarity of the carbon monoxide.

A further important characteristic of zeolite X is its property of adsorbing large amounts of adsorbates at low adsorbate pressures, partial pressures, or concentrations. This property makes zeolite X useful in the removal of adsorbable impurities from gas and liquid mixtures, since it has a relatively high adsorption capacity even when the material being adsorbed from a mixture is present in very low concentrations. Efficient recovery of minor components of mixtures is also possible. High adsorption at low pressures on zeolite X are illustrated in the following table, along with some comparative data for silica gel and charcoal.

| Adsorbate | Temperature (°C.) | Pressure (mm. Hg) | Weight percent adsorbed | | |
|---|---|---|---|---|---|
| | | | Na$_2$X | Silica gel | Charcoal |
| Water | 25 | 0.02 | 14.5 | 0.7 | 0.4 |
| | 25 | 0.1 | 23.1 | 1.2 | |
| | 25 | 4.5 | 32.3 | 11.4 | 2.7 |
| | 25 | Pc | 39.5 | 42.9 | 24.1 |
| CO$_2$ | 25 | 1.6 | 3.7 | 0.5 | 0.5 |
| | 25 | 80 | 18.0 | 0.6 | 2.3 |
| | 25 | 750 | 26.3 | 4.6 | 10.0 |
| SO$_2$ | 25 | 0.7 | 30.2 | | 1.7 |
| | 25 | 12 | 38.1 | | 10.7 |
| | 25 | 696 | 42.9 | | 61.6 |
| H$_2$S | 25 | 0.5 | 11.5 | | |
| | 25 | 11 | 22.6 | | |
| | 25 | 400 | 35.0 | | |
| NH$_3$ | 25 | 0.6 | 5.9 | 1.9 | 0.3 |
| | 25 | 9 | 12.7 | 5.9 | 0.4 |
| | 25 | 700 | 19.7 | 12.9 | 8.3 |
| C$_2$H$_2$ | 25 | 4.9 | 6.6 | | |
| | | 25 | 9.8 | 1.7 | 2.0 |
| | | 200 | 13.3 | 2.2 | 4.0 |
| | | 740 | 14.7 | 2.2 | 4.9 |
| C$_2$H$_4$ | 25 | 37 | 7.1 | 2.1 | 4.4 |
| | | 160 | 10.1 | 2.7 | 7.1 |
| C$_2$H$_6$ | 25 | 25 | 0.8 | 0.0 | 3.3 |
| | | 300 | 8.3 | 0.6 | 8.8 |
| | | 700 | 10.2 | 1.4 | 11.4 |
| C$_3$H$_6$ | 25 | 0.1 | 2.2 | 0.1 | |
| | | 2 | 8.5 | 0.3 | |
| | | 48 | 14.9 | 3.1 | 11.6 |
| C$_3$H$_8$ | 25 | 4 | 2.6 | 0.1 | |
| | | 25 | 11.1 | 0.8 | |
| | | 700 | 14.6 | 6.5 | |
| i-C$_4$H$_{10}$ | 25 | 0.2 | 2.4 | 0.0 | |
| | | 5.5 | 11.5 | 0.7 | 15.9 |
| | | 400 | 18.4 | 11.8 | 27.2 |
| C$_4$H$_8$-1 | 25 | 0.1 | 9.9 | 0.4 | |
| | | 5 | 17.0 | 2.2 | 12.5 |
| | | 350 | 19.6 | 15.5 | 28.9 |
| n-C$_6$H$_{14}$ (normal hexane) | 25 | 0.18 | 4.8 | | |
| | | 0.22 | 10.2 | | |
| | | 20 | 19.2 | | |
| cyclo-hexane C$_6$H$_{12}$ | 25 | 0.03 | 4.8 | | |
| | | 0.18 | 17.5 | | |
| | | 45 | 19.6 | | |
| Toluene C$_6$H$_5$CH$_3$ | 25 | 0.03 | 7.5 | | |
| | | 0.08 | 18.0 | | |
| | | 27 | 26.8 | | |
| CO | 0 | 50 | 0.8 | | |
| | | 298 | 3.2 | | |
| | | 750 | 5.1 | | |
| CH$_3$OH | 25 | 0.01 | 6.6 | 1.3 | 0.0 |
| | | 0.08 | 14.5 | 3.8 | 0.3 |
| | | 1.2 | 21.7 | 9.3 | 1.6 |
| | | 90 | 24.1 | 28.4 | |

| Adsorbate | Temperature (°C.) | Pressure (mm. Hg) | Weight percent adsorbed | | | |
|---|---|---|---|---|---|---|
| | | | Na$_2$X | BaX | CaX | K$_2$X |
| Nitrogen | $-196$ | 5 | 24.8 | | | |
| Do | $-196$ | 195 | | 21.9 | 27.5 | |
| Oxygen | $-196$ | 56 | 34.0 | | | |
| Argon | $-196$ | 146 | 42.0 | 34.1 | 43.7 | |
| Krypton | $-183$ | 17 | 73 | | | |
| Hydrogen | $-196$ | 100 | <1 | | | |
| Helium | $-196$ | 100 | <1 | | | |
| Carbon monoxide | $-75$ | 500 | 15.8 | | | |
| Nitrogen | $-75$ | 500 | 9.6 | 10.0 | 7.9 | |
| Oxygen | $-75$ | 500 | 5.2 | 6.5 | 5.8 | |
| Argon | $-75$ | 500 | | 5.1 | 5.0 | |
| Oxygen | 25 | 500 | <1 | | | |
| Nitrogen | 25 | 500 | <1 | | | |
| Hydrogen | 25 | 500 | <1 | | | |
| Carbon monoxide | 25 | 500 | | | | 1.8 |
| Methane | 25 | 500 | <1 | | | |

These data show that water is more strongly adsorbed than any other material at comparable temperatures and pressures and illustrates a major use of zeolite X, i.e., the removal of water from mixtures containing water.

An example of the use to be made of this property of strong adsorption at low pressures is the drying of an air stream that contains only small amounts of water initially. For instance, with air containing water at a partial pressure of 0.1 millimeter of mercury zeolite X adsorbs approximately 23% by weight water. Under similar conditions, silica gel adsorbs only about 1% by weight water. Similarly this property may be utilized in the recovery of traces of ethylene, acetylene propylene and other gases from by product or waste gas streams.

The table also demonstrates the low adsorptivity of hydrogen and helium on zeolite X compared to oxygen, nitrogen, argon and krypton, and indicate the use of zeolite X in the separation of the very volatile gases like hydrogen, helium and neon from the less volatile gases such as oxygen, nitrogen, argon, krypton or xenon.

The table shows that at $-75°$ C. nitrogen is adsorbed more strongly than oxygen and argon and oxygen more strongly than argon permitting the separation of nitrogen from mixtures with oxygen and argon and the separation of oxygen from mixtures with argon by means of zeolite X.

The table also shows that at the same temperature (25° C. in the table) acetylene is more strongly adsorbed at a given pressure than are oxygen, nitrogen, hydrogen, carbon monoxide, carbon dioxide, methane and ethylene. Thus acetylene may be removed from mixtures comprising these less strongly adsorbed gases by means of zeolite X.

Similarly ethylene is more strongly adsorbed than oxygen, nitrogen, hydrogen and carbon monoxide and zeolite X may be used in separating mixtures of ethylene from mixtures of ethylene with the other named gases.

Carbon monoxide is seen to be adsorbed preferentially to hydrogen, nitrogen, oxygen, argon and methane, and the use of zeolite X to separate carbon monoxide from mixtures with any of these other gases is demonstrated.

Carbon dioxide is more strongly adsorbed than hydrogen, helium, nitrogen, oxygen, methane, ethane, and ethylene. Similarly the sulfur dioxide is preferentially adsorbed from mixtures with hydrogen, nitrogen, oxygen, ethylene, carbon monoxide and carbon dioxide. The same is true for mixtures of hydrogen sulfide with hydrogen, nitrogen, oxygen, carbon monoxide, carbon dioxide, methane, ethylene, propane, butane, and pentane. Ammonia is more strongly adsorbed than hydrogen, nitrogen, oxygen, carbon monoxide, carbon dioxide, methane and ethane.

Another advantage that may be taken of this high adsorption at low pressures is the operation of adsorption processes at higher temperatures than are normally used with common adsorbents. The adsorptive power of physical adsorbents usually decreases with increasing temperature, and therefore while the adsorption capacity of many adsorbents in a certain separation may be sufficient if operated at one temperature, the capacity may not be sufficient to make operation feasible at a higher temperature. With strongly adsorbing zeolite X, however, substantial capacity is retained at higher temperatures. For instance, the adsorption isotherms for water on calcium zeolite X and silica gel at 25° C. and 100° C. are tabulated below and it is seen that calcium zeolite X adsorbs more water at 100° C. than silica gel at 25° C. over most of the pressure range.

| Pressure (mm. Hg) | Weight percent adsorbed at 25° C. | | Pressure (mm. Hg °) | Weight percent adsorbed at 100° C. | |
|---|---|---|---|---|---|
| | Silica gel | Na₂X | | Silica gel | Na₂X |
| 0.1 | 1.2 | 23.1 | 0.6 | 0.2 | 9.6 |
| 4.5 | 11.4 | 32.3 | 4.5 | 0.6 | 15.8 |
| P₀ | 42.9 | 39.5 | P₀ | 15 | 20.9 |

P₀ is the vapor pressure of water at 25° C.

The activation, re-activation or re-generation methods that may be used with zeolite X differ from those used for the common adsorbents. Zeolite X may be activated originally by heating in air or vacuum or other appropriate gas. Temperatures of as high as about 700° C. have been found to be satisfactory for activation. Under similar conditions most other adsorbents are either partially or completely destroyed by the heat or oxidized by the air. The conditions used for desorption of an adsorbate from zeolite X vary with the adsorbate but either one or a combination of raising the temperature and reducing the pressure, partial pressure of concentration of the adsorbate in contact with the adsorbent is usually employed. Another method is the displacement of the adsorbate by adsorption of another more strongly held adsorbate. For instance, acetylene adsorbed on a bed of zeolite X has been displaced by the adsorption of water thereby.

Zeolite X may be used as an adsorbent for the purposes indicated above in any suitable form. For example, a column of powdered crystalline material has given excellent results as has a pelleted form obtained by pressing into pellets a mixture of zeolite X and a suitable bonding agent such as clay.

I claim:

1. A crystalline synthetic material having a composition expressed in terms of oxides as follows:

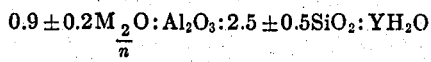

wherein "M" represents at least one cation having a valence of not more than three, "$n$" represents the valence of "M," and "Y" may be any value up to about 8, the atoms of said material being arranged in a unit cell in such a manner that the X-ray powder diffraction pattern of the material is essentially the same as that shown in Table A.

2. A crystalline synthetic material having a composition expressed in terms of oxides as follows:

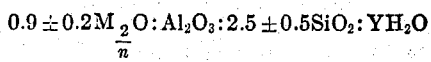

wherein "M" represents at least one cation having a valence of not more than three, "$n$" represents the valence of "M," and "Y" may be any value up to about 8, the atoms of said material being arranged in a unit cell in such a manner that the X-ray powder diffraction pattern of the material is essentially the same as that shown in Table B.

3. A crystalline synthetic sodium-aluminum silicate having a composition expressed in terms of oxides as follows:

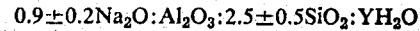

wherein "Y" may be any value up to about 6.2, the atoms of said silicate being arranged in a unit cell in such a manner that the X-ray powder diffraction pattern of the silicate is essentially the same as that shown in Table A for sodium zeolite X.

4. A crystalline synthetic sodium-aluminum-silicate having a composition expressed in terms of oxides as follows:

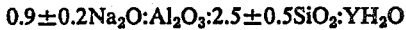

wherein "Y" may be any value up to about 6.2, the atoms of said silicate being arranged in a unit cell in such a manner that the X-ray powder diffraction pattern of the silicate is essentially the same as that shown in Table B.

5. A crystalline synthetic calcium-aluminum-silicate having a composition expressed in terms of oxides as follows:

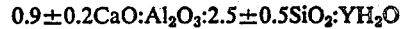

wherein "Y" may be any value up to about 7, the atoms of said silicate being arranged in a unit cell in such a manner that the X-ray powder diffraction pattern of the silicate is essentially the same as that shown in Table A for calcium zeolite X.

6. A crystalline synthetic calcium-aluminum-silicate having a composition expressed in terms of oxides as follows:

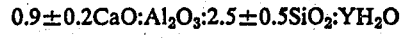

wherein "Y" may be any value up to about 7, the atoms of said silicate being arranged in a unit cell in such a manner that the X-ray powder diffraction pattern of the silicate is essentially the same as that shown in Table B.

7. A crystalline synthetic magnesium-aluminum-silicate having a composition expressed in terms of oxides as follows:

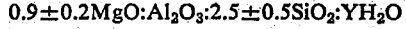

wherein "Y" may be any value up to about 8, the atoms of said silicate being arranged in a unit cell in such a manner that the X-ray powder diffraction pattern of the silicate is essentially the same as that shown in Table A for magnesium zeolite X.

8. A crystalline synthetic magnesium-aluminum-silicate having a composition expressed in terms of oxides as follows:

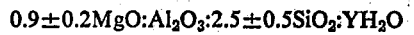

wherein "Y" may be any value up to about 8, the atoms of said silicate being arranged in a unit cell in such a manner that the X-ray powder diffraction pattern of the silicate is essentially the same as that shown in Table B.

9. A crystalline synthetic lithium-aluminum-silicate having a composition expressed in terms of oxides as follows:

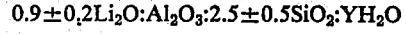

wherein "Y" may be any value up to about 8, the atoms of said silicate being arranged in a unit cell in such a manner that the X-ray powder diffraction pattern of the silicate is essentially the same as that shown in Table A for lithium zeolite X.

10. A crystalline synthetic lithium-aluminum-silicate having a composition expressed in terms of oxides as follows:

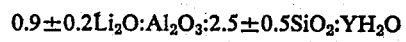

wherein "Y" may be any value up to about 8, the atoms of said silicate being arranged in a unit cell in such a manner that the crystal's X-ray powder diffraction pattern of the silicate is essentially the same as that shown in Table B.

11. A crystalline synthetic barium-aluminum-silicate having a composition expressed in terms of oxides as follows:

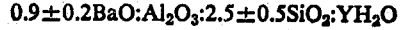

wherein "Y" may be any value up to about 7, the atoms of said silicate being arranged in a unit cell in such a manner that the crystal's X-ray powder diffraction pattern of the silicate is essentially the same as that shown in Table A for barium zeolite X.

12. A crystalline synthetic barium-aluminum-silicate having a composition expressed in terms of oxides as follows:

$$0.9 \pm 0.2 BaO : Al_2O_3 : 2.5 \pm 0.5 SiO_2 : YH_2O$$

wherein "Y" may be any value up to about 7, the atoms of said silicate being arranged in a unit cell in such a manner that the X-ray powder diffraction pattern of the silicate is essentially the same as that shown in Table B.

13. Synthetic crystalline aluminum-silicate having a composition expressed in terms of oxides as follows:

$$0.9 \pm 0.2 \frac{M_2O}{n} : Al_2O_3 : 2.5 \pm 0.5 SiO_2 : YH_2O$$

wherein "M" represents a cation having a valence of not more than three, "n" represents the valence of "M," and "Y" may be any value up to about 8, the atoms of said silicate being arranged in a unit cell in such a manner that the X-ray powder diffraction pattern of the silicate is essentially the same as that shown in Table A, said crystalline silicate being from 0.01 micron to 100 microns in size.

14. Synthetic crystalline aluminum-silicate having a composition expressed in terms of oxides as follows:

$$0.9 \pm 0.2 \frac{M_2O}{n} : Al_2O_3 : 2.5 \pm 0.5 SiO_2 : YH_2O$$

wherein "M" represents at least one cation having a valence of not more than three, "n" represents the valence of "M," and "Y" may be any value up to about 8, the atoms of said silicate being arranged in a unit cell in such a manner that the X-ray powder diffraction pattern of the silicate is essentially the same as that shown in Table B, said crystalline silicate being from 0.01 micron to 100 microns in size.

15. A crystalline synthetic sodium-aluminum-silicate having silicon and aluminum present in such proportion that the ratio of silica to alumina in the silicate is equal to between two and three, the atoms of said silicate being arranged in a unit cell in such a manner that the X-ray powder diffraction pattern of the silicate is essentially the same as that shown in Table A, at least a portion of the sodium in said silicate being replaced by at least one of the elements in the group consisting of potassium, calcium, magnesium, lithium and barium.

16. A crystalline synthetic sodium-aluminum-silicate having silicon and aluminum present in such proportion that the ratio of silica to alumina in the silicate is equal to between two and three, the atoms of said silicate being arranged in a unit cell in such a manner that the X-ray powder diffraction pattern of the silicate is essentially the same as that shown in Table B, at least a portion of the sodium in said silicate being replaced by at least one of the elements in the group consisting of potassium, calcium, magnesium, lithium and barium.

17. Crystalline synthetic aluminum silicate having a composition expressed in terms of oxides as follows:

$$0.9 \pm 0.2 \frac{M_2O}{n} : Al_2O_3 : 2.5 \pm 0.5 SiO_2 : YH_2O$$

wherein "M" represents a cation having a valence of not more than three, "n" represents the valence of "M," and "Y" may be any value up to about 8, the atoms of said silicate being arranged in a unit cell in such a manner that the X-ray powder diffraction pattern of the silicate is essentially the same as that shown in Table A, said silicate being further characterized in that at a temperature of about 25° C. substantial amounts of benzene but less than about 5% by weight of heptacosafluorotributylamine are adsorbed by said silicate when at least partially dehydrated.

18. Crystalline synthetic aluminum silicate having a composition expressed in terms of oxides as follows:

$$0.9 \pm 0.2 \frac{M_2O}{n} : Al_2O_3 : 2.5 \pm 0.5 SiO_2 : YH_2O$$

wherein "M" represents at least one cation having a valence of not more than three, "n" represents the valence of "M," and "Y" may be any value up to about 8, the atoms of said silicate being arranged in a unit cell in such a manner that the X-ray powder diffraction pattern of the silicate is essentially the same as that shown in Table B, said silicate being further characterized in that at a temperature of about 25° C. substantial amounts of benzene but less than about 5% by weight of heptacosafluorotributylamine are adsorbed by said silicate when it is at least partially dehydrated.

19. Method of preparing a sodium aluminum silicate having atoms arranged in a unit cell in such a manner that the X-ray powder diffraction pattern of the silicate is essentially the same as that shown in Table A, which comprises preparing a sodium-aluminum-silicate water mixture whose composition, expressed in terms of oxide-mole-ratios, falls within the range:

$SiO_2/Al_2O_3$ from 3.0 to 5.0
$Na_2O/SiO_2$ from 1.2 to 1.5
$H_2O/Na_2O$ from 35 to 60;

maintaining the mixture at a temperature within the range from about 20° C. to 120° C. until crystals as previously defined are formed; and separating the crystals from the mother liquor.

20. Method of preparing a sodium aluminum silicate having atoms arranged in a unit cell in such a manner that the X-ray powder diffraction pattern of the silicate is essentially the same as that shown in Table B, which comprises preparing a sodium-aluminum-silicate water mixture whose composition, expressed in terms of oxide-mole ratios, falls within the range:

$SiO_2/Al_2O_3$ from 3.0 to 5.0
$Na_2O/SiO_2$ from 1.2 to 1.5
$H_2O/Na_2O$ from 35 to 60;

maintaining the mixture at a temperature within the range from about 20° C. to 120° C. until crystals as previously defined are formed; and separating the crystals from the mother liquor.

References Cited in the file of this patent

UNITED STATES PATENTS

| | | |
|---|---|---|
| 1,682,588 | Wietzel | Aug. 28, 1928 |
| 1,906,203 | Bruce | Apr. 25, 1933 |
| 2,137,605 | Derr | Nov. 22, 1938 |
| 2,306,610 | Barrer | Dec. 29, 1942 |
| 2,413,134 | Barrer | Dec. 24, 1946 |
| 2,512,053 | Calmon | June 20, 1950 |
| 2,617,712 | Bond | Nov. 11, 1952 |

FOREIGN PATENTS

| | | |
|---|---|---|
| 574,911 | Great Britain | Jan. 25, 1946 |

OTHER REFERENCES

Mellor: "Comprehensive Treatise on Inorganic and Theoretical Chemistry," vol. 6, 1925, pages 567, 568, 576–579, Longmans, Green and Co., New York, N.Y.

Synthesis of Zeolitic Mineral, Barrer, Chemical Society Journal, London, 1948, pp. 127–143.

Barrer et al.: The Hydrothermal Chemistry of Silicates, part II, Jour. of Chem. Soc., 1952, pp. 1561–1571.

Physical Chemistry of the Silicates, Eitel, Univ. of Chicago Press, 1954, pp. 994–1021.